United States Patent
Chen et al.

(10) Patent No.: US 8,416,569 B2
(45) Date of Patent: Apr. 9, 2013

(54) POWER SUPPLY ASSEMBLY

(75) Inventors: Yun-Lung Chen, Taipei Hsien (TW);
Chung Chai, Taipei Hsien (TW);
Yu-Gui Chen, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 282 days.

(21) Appl. No.: 12/907,095

(22) Filed: Oct. 19, 2010

(65) Prior Publication Data

US 2011/0304986 A1    Dec. 15, 2011

(30) Foreign Application Priority Data

Jun. 11, 2010    (CN) .......................... 2010 1 0198955

(51) Int. Cl.
*H05K 7/20* (2006.01)
*H05K 7/00* (2006.01)

(52) U.S. Cl. .................. 361/690; 361/679.02; 361/727; 361/728; 361/747

(58) Field of Classification Search .................. 361/690, 361/679.02, 727, 728, 747
See application file for complete search history.

(56) References Cited

U.S. PATENT DOCUMENTS

| | | | | |
|---|---|---|---|---|
| 5,121,296 A * | 6/1992 | Hsu | ........................ | 361/679.39 |
| 5,136,465 A * | 8/1992 | Benck et al. | ............. | 361/679.31 |
| 5,172,305 A * | 12/1992 | DeWilde | ....................... | 361/796 |
| 5,224,019 A * | 6/1993 | Wong et al. | ............. | 361/679.37 |
| 5,347,425 A * | 9/1994 | Herron et al. | ............ | 361/679.41 |
| 5,761,045 A * | 6/1998 | Olson et al. | ................... | 361/726 |
| 5,777,848 A * | 7/1998 | McAnally et al. | ............ | 361/725 |
| 5,790,372 A * | 8/1998 | Dewey et al. | ............ | 361/679.58 |
| 5,808,864 A * | 9/1998 | Jung | ........................ | 361/679.32 |
| 6,134,115 A * | 10/2000 | Sim et al. | ....................... | 361/747 |
| 6,229,696 B1 * | 5/2001 | Lin et al. | .................. | 361/679.58 |
| 6,288,901 B1 * | 9/2001 | Liu et al. | ....................... | 361/724 |
| 6,483,696 B1 * | 11/2002 | Gan | ............................. | 361/610 |
| 6,530,628 B1 * | 3/2003 | Huang et al. | ............... | 312/223.2 |
| 6,582,150 B1 * | 6/2003 | Davis et al. | ................... | 403/330 |
| 6,608,754 B2 * | 8/2003 | Chen et al. | .................... | 361/724 |
| 6,685,503 B1 * | 2/2004 | Huang et al. | ................. | 439/527 |
| 6,801,435 B1 * | 10/2004 | Su et al. | ........................ | 361/747 |
| 7,123,469 B2 * | 10/2006 | Chen et al. | .................... | 361/601 |
| 7,200,004 B2 * | 4/2007 | Chen et al. | ............. | 361/679.39 |
| 7,206,197 B2 * | 4/2007 | Chen et al. | ............. | 361/679.02 |
| 7,218,508 B2 * | 5/2007 | Chen et al. | ............. | 361/679.57 |
| 7,218,516 B2 * | 5/2007 | Yu et al. | ........................ | 361/695 |
| 7,365,971 B2 * | 4/2008 | Chen et al. | ............. | 361/679.33 |
| 7,699,281 B2 * | 4/2010 | Chen et al. | ................. | 248/284.1 |
| 7,715,177 B2 * | 5/2010 | Chen et al. | ............. | 361/679.01 |

(Continued)

*Primary Examiner* — Anatoly Vortman
(74) *Attorney, Agent, or Firm* — Altis Law Group, Inc.

(57) ABSTRACT

A power supply assembly includes an enclosure body, a cover panel mounted to the enclosure body, a power supply unit, and a positioning element. The enclosure body includes a bottom panel, a rear panel, and a side panel. The power supply unit is mounted in the enclosure body and is prevented from moving in a first direction substantially perpendicular to the rear panel and a second direction substantially perpendicular to the side panel. The positioning element includes a plate body, a first positioning portion, and a second positioning portion. The power supply unit is sandwiched between the bottom panel and the plate body. The first positioning portion is for preventing the power supply unit from moving along a first direction substantially parallel to the bottom panel. The second positioning portion for preventing the power supply unit from moving along a second direction parallel to the bottom panel.

19 Claims, 5 Drawing Sheets

U.S. PATENT DOCUMENTS

| | | | |
|---|---|---|---|
| 7,848,086 B1* | 12/2010 | Chen | 361/679.01 |
| 7,848,088 B2* | 12/2010 | Liu | 361/679.02 |
| 8,075,070 B2* | 12/2011 | Fan et al. | 312/223.2 |
| 2005/0099764 A1* | 5/2005 | Chen et al. | 361/679 |
| 2005/0152107 A1* | 7/2005 | Chen et al. | 361/683 |
| 2006/0139865 A1* | 6/2006 | Chen et al. | 361/683 |
| 2007/0139902 A1* | 6/2007 | Chen et al. | 361/796 |
| 2007/0153451 A1* | 7/2007 | Chen et al. | 361/679 |
| 2008/0130245 A1* | 6/2008 | Chen et al. | 361/726 |
| 2009/0310299 A1* | 12/2009 | Liu | 361/679.58 |
| 2010/0124015 A1* | 5/2010 | Chen et al. | 361/679.58 |
| 2010/0149778 A1* | 6/2010 | Yeh et al. | 361/809 |
| 2011/0273843 A1* | 11/2011 | Chen et al. | 361/690 |

* cited by examiner

POWER SUPPLY ASSEMBLY

BACKGROUND

1. Technical Field

The present disclosure relates to a power supply assembly with a positioning element for mounting a power supply unit.

2. Description of Related Art

A conventional computer system usually includes a power supply unit in a computer case. The installation of the power supply unit in the computer case usually involves the use of screws, which is inconvenient. The screws are small and difficult to manipulate and install. Additionally, because of their small size, the screws may be dropped during the process, possibly causing damage to other parts in the computer case.

Therefore, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
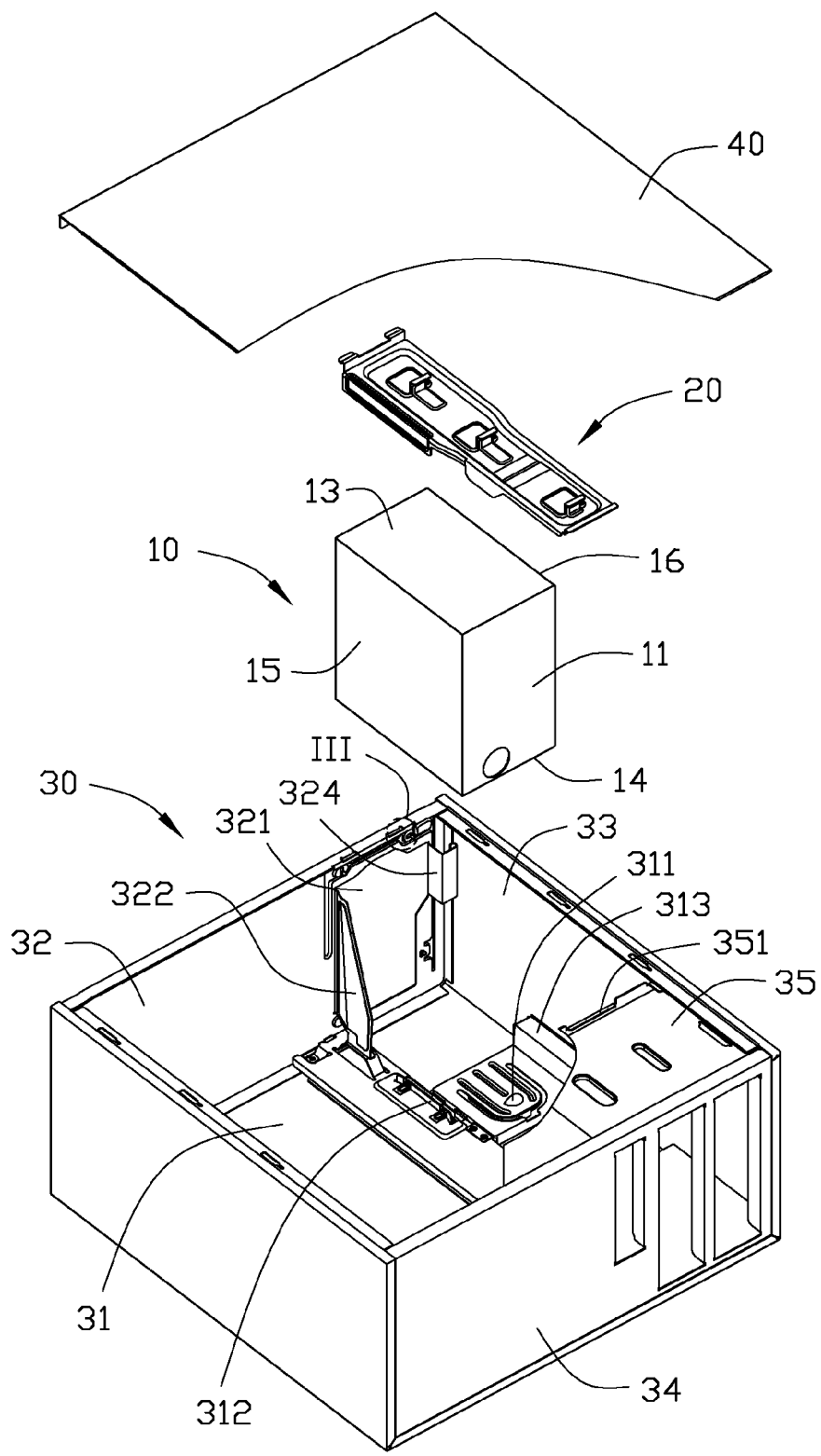
FIG. 1 is an exploded, isometric view of a power supply assembly of an exemplary embodiment, including a positioning element.

Referring to FIG. 1, a power supply assembly includes an enclosure (not labeled), a power supply unit 10, and a positioning element 20.

The enclosure includes an enclosure body 30 and a cover panel 40 for mounting to the enclosure body 30. The enclosure body 30 includes a bottom panel 31 substantially parallel to the cover panel 40; a rear panel 32 substantially perpendicular to the bottom panel 31; a side panel 33 substantially perpendicular to the bottom panel 31; a front panel 34 substantially parallel to the rear panel 32; and a drive bracket 35 mounted in the enclosure body 30. The side panel 33 is substantially perpendicular to the rear panel 32.

Figure 2:
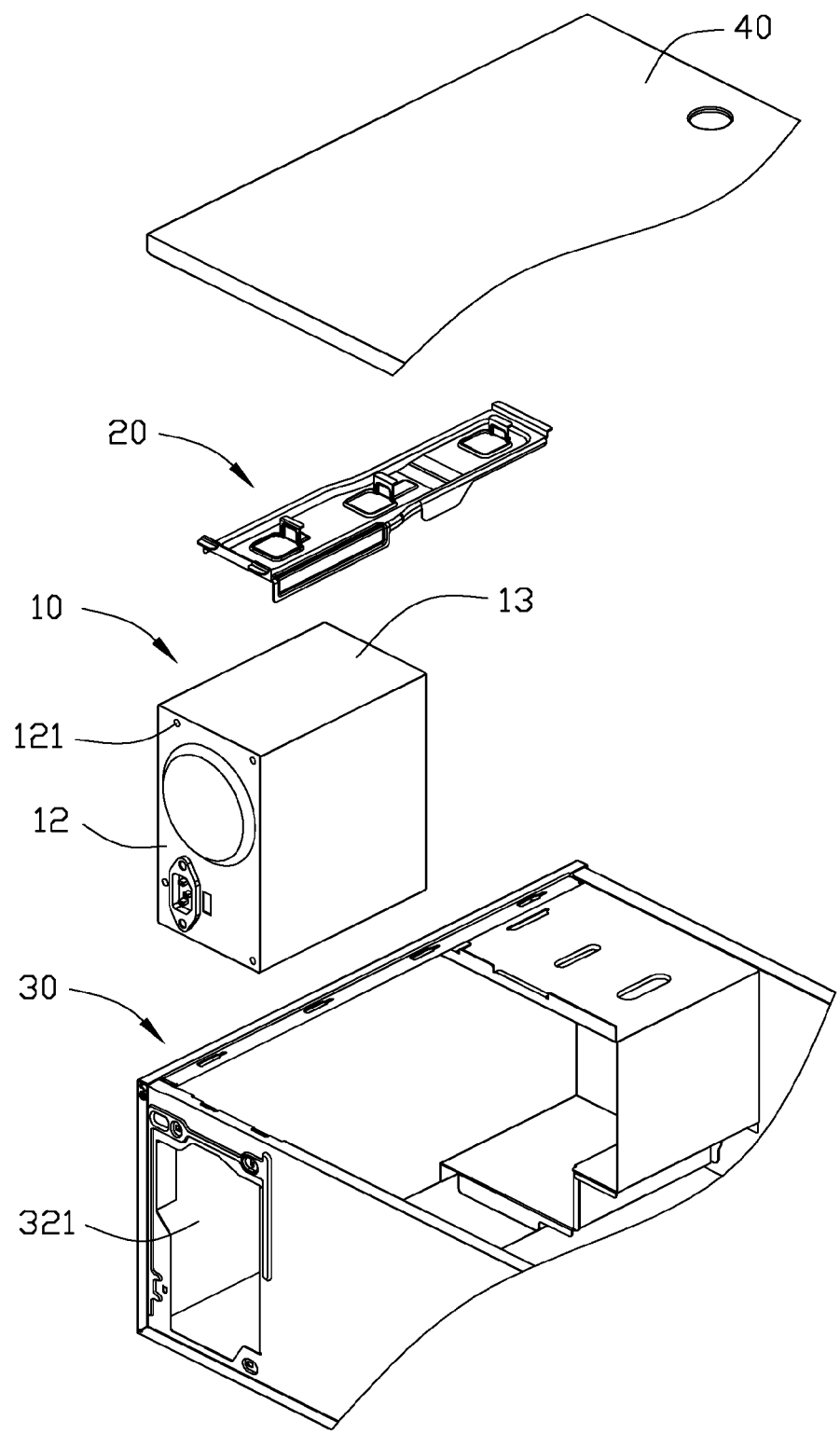
FIG. 2 is similar to FIG. 1, but viewed from another aspect.
Figure 3:
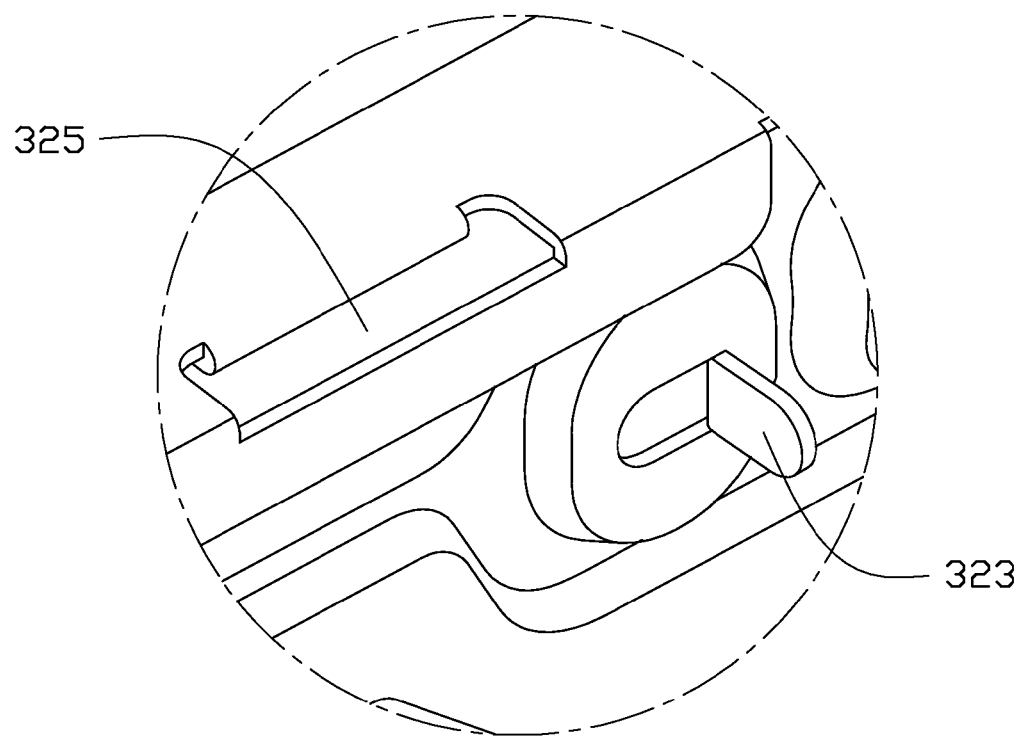
FIG. 3 is an enlarged view of section III of FIG. 1.

Referring to FIGS. 2 and 3, the bottom panel 31 includes a first resisting portion 311, a second resisting portion 312, and a third resisting portion 313. An airflow opening 321 is defined in the rear panel 32. The rear panel 32 includes a first resisting plate 322 and a second resisting plate 324 extending from opposite sides of the airflow opening 321. The rear panel 32 further includes protrusions 323 surrounding the airflow opening 321. A first mounting opening 325 is defined in the rear panel 32. The drive bracket 35 is adjacent to the front panel 34. A second mounting opening 351 is defined in the drive bracket 35.

The power supply unit 10 defines a front surface 11; a rear surface 12 substantially parallel to the front surface 11; a top surface 13; a bottom surface 14 substantially parallel to the top surface 13; a first side surface 15; and a second side surface 16 substantially parallel to the first side surface 15. Positioning holes 121 are defined in the rear surface 12 for respectively corresponding to the protrusions 323 of the rear panel 32. A distance between the first side surface 15 and the second side surface 16 is less than the distance between the second resisting portion 312 and the third resisting portion 313, and is also less than the distance between the first resisting plate 322 and the second resisting plate 324. A distance between the front surface 11 and the rear surface 12 is less than the distance between the first resisting portion 311 and the rear panel 32.

Figure 4:
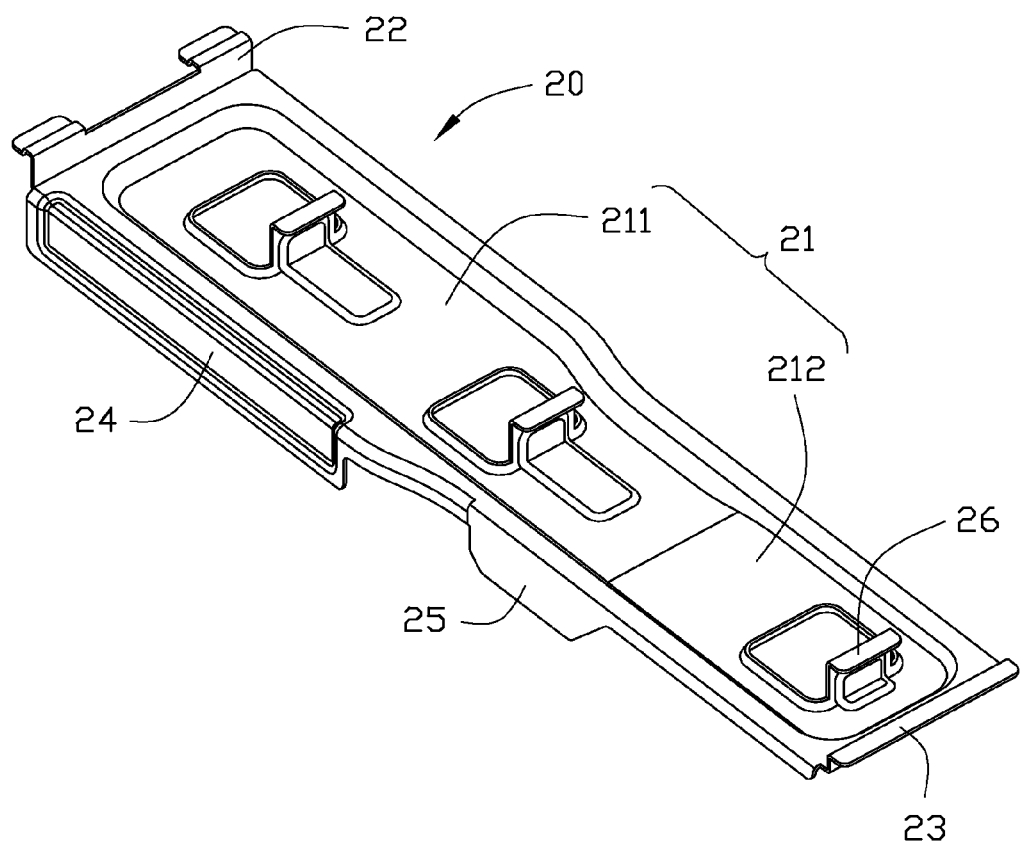
FIG. 4 is an isometric view of the positioning element of FIG. 1.
Figure 5:
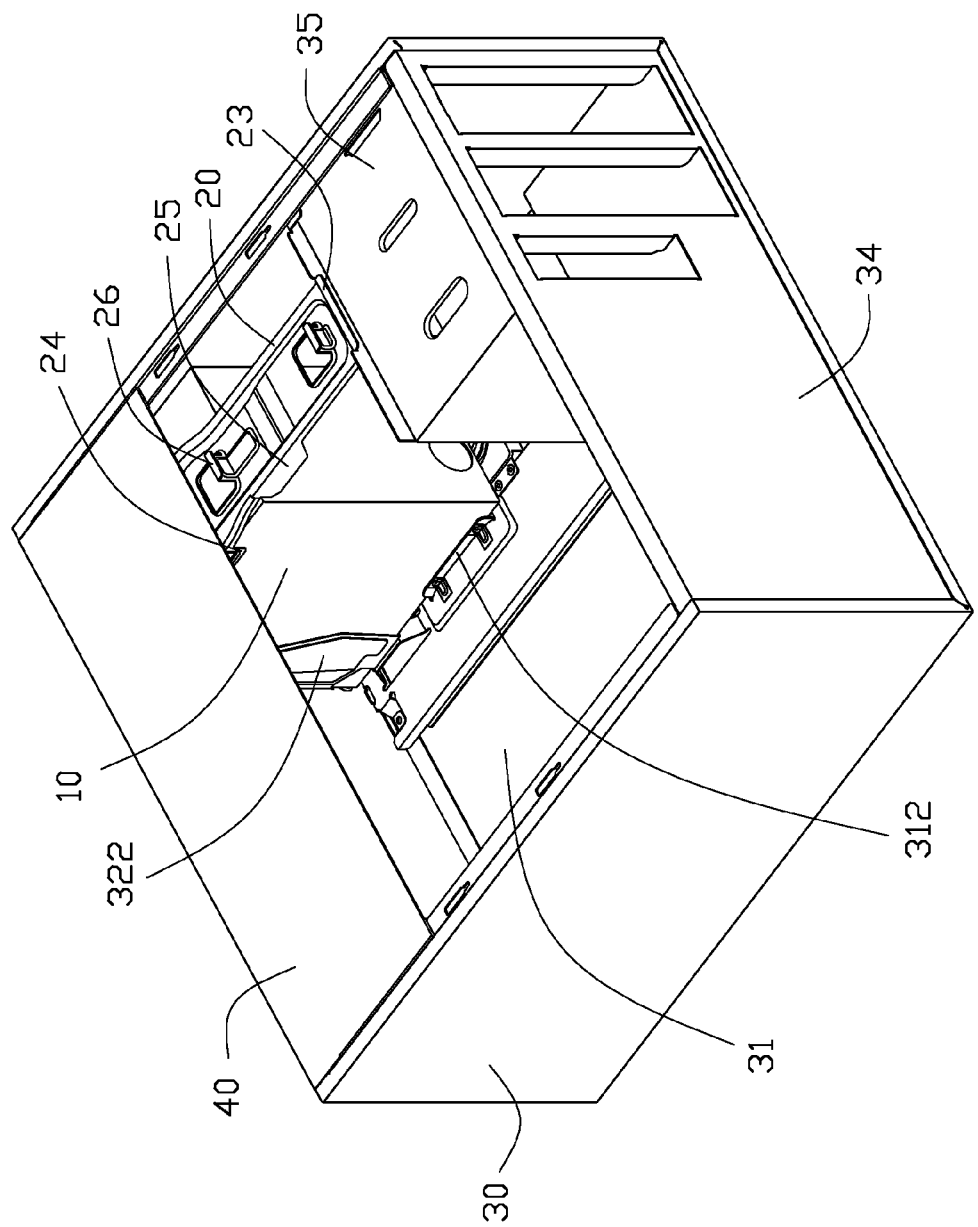
FIG. 5 is an assembled view of FIG. 1.

Referring to FIG. 4, the positioning element 20 includes a plate body 21. The plate body 21 includes a larger portion 211 and a narrower portion 212 extending from the larger portion 211. The larger portion 211 includes an L-shaped first supporting portion 22 away from the narrower portion 212. The narrow portion 212 includes an L-shaped second supporting portion 23. The first supporting portion 22 corresponds to the first mounting opening 325 of the rear panel 32. The second supporting portion 23 corresponds to the second mounting opening 351 of the drive bracket 35. The positioning element 20 further includes a first positioning portion 24 extending from the larger portion 211 and a second positioning portion 25 extending from the narrower portion 212. The first positioning portion 24 and the second positioning portion 25 are disposed on the same side of the plate body 21. The positioning element 20 further includes a plurality of elastic resisting tab 26.

Referring to FIGS. 1 through 5, in assembly, the rear surface 12 of the power supply unit 10 is aligned with the airflow opening 321 of the rear panel 32, and the positioning holes 121 of the power supply unit 10 are aligned with the protrusions 323 of the rear panel 32. The first side surface 15 and the second side surface 16 of the power supply unit 10 are placed between the second resisting portion 312 and the third resisting portion 313. The power supply unit 10 is pushed backwards until the rear surface 12 resists the rear panel 32. At this time, the protrusions 323 are mounted in the positioning holes 121 and the rear portion of the power supply unit 10 is disposed between the first resisting plate 322 and the second resisting plate 324. The front portion of the power supply unit 10 is pressed downwards until the front surface 11 and the rear surface 12 of the power supply unit 10 reach the first resisting portion 311 and the rear panel 32. The first and second supporting portions 22, 23 of the positioning element 20 are placed in the first and second mounting openings 325, 351. At this time, the plate body 21 of the positioning element 20 contacts the top surface 13 of the power supply unit 10. The first positioning portion 24 of the positioning element 20 contacts the first side surface 15 of the power supply unit 10, and the second positioning portion 25 contacts the front surface 11 of the power supply unit 10. The cover panel 40 is then mounted to the enclosure body 30 to abut the elastic tabs 26 of the positioning element 20 to enable the plate body 21 of the positioning element 20 to abut against the top surface 13 of the power supply unit 10. The first positioning portion 24 is for preventing the power supply unit 10 from moving along a direction substantially parallel to the bottom panel 31 and perpendicular to the first side surface 15 of the power supply unit 10. The second positioning portion 25 is for preventing the power supply unit 10 from moving along a direction substantially parallel to the bottom panel 31 and perpendicular to the front surface 11 of the power supply unit 10. The plate body 21 is for preventing the power supply unit 10 from moving along a direction perpendicular to the bottom panel 31.

In disassembly, the cover panel 40 is first dismounted from the enclosure body 30. The positioning element 20 is moved up to be separated from the enclosure body 30. The front portion of the power supply unit 10, when raised, separates from the first resisting portion 311, and forward motion separates the power supply unit 10 from the enclosure body 30.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply assembly, comprising:
an enclosure body comprising a bottom panel, a rear panel substantially perpendicular to the bottom panel, and a side panel substantially perpendicular to the bottom panel and the rear panel;
a cover panel mounted to the enclosure body and substantially parallel to the bottom panel;
a power supply unit mounted in the enclosure body, the power supply unit disposed between the bottom panel and the cover panel; and
a positioning element mounted between the power supply unit and the cover panel, the positioning element comprising a plate body, a first positioning portion extending from the plate body, and a second positioning portion extending from the plate body, the power supply unit sandwiched between the bottom panel and the plate body, the first positioning portion for preventing the power supply unit from moving along a first direction substantially parallel to the bottom panel, the second positioning portion for preventing the power supply unit from moving along a second direction parallel to the bottom panel;
wherein the plate body comprises a larger portion and a narrower portion extending from the larger portion; the first positioning portion extends from the larger portion, and the second positioning portion extends from the narrower portion; and the enclosure body further comprises a drive bracket, and the plate body placed between the rear panel and the drive bracket.

2. The power supply assembly of claim 1, wherein a first mounting opening is defined in the rear panel, and the plate body comprises a first supporting portion corresponding to the first mounting opening.

3. The power supply assembly of claim 2, wherein the first supporting portion is L-shaped.

4. The power supply assembly of claim 2, wherein a second mounting opening is defined in the drive bracket, and the plate body comprises a second supporting portion corresponding to the second mounting opening.

5. The power supply assembly of claim 1, wherein the positioning element further comprises an elastic tab extending from the plate body, the elastic tab elastically abutting the cover panel.

6. The power supply assembly of claim 1, wherein the power supply unit defines a front surface and a first side surface substantially perpendicular to the front surface, the first positioning portion contacting the first side surface, and the second positioning portion contacting the front surface.

7. The power supply assembly of claim 1, wherein an airflow opening is defined in the rear panel corresponding to the power supply unit; the rear panel comprises a plurality of protrusions adjacent to the airflow opening, and a plurality of positioning holes is defined in the power supply unit corresponding to the protrusions.

8. The power supply assembly of claim 1, wherein an airflow opening is defined in the rear panel corresponding to the power supply unit; the rear panel comprises a first resisting plate and a second resisting plate extending from opposite sides of the airflow opening.

9. A power supply assembly, comprising:
a power supply unit; and
an enclosure body, the enclosure body comprising a bottom panel, a rear panel substantially perpendicular to the bottom panel, and a side panel substantially perpendicular to the bottom panel and the rear panel, the enclosure body receiving the power supply unit to enable the power supply unit only to move along a first direction substantially perpendicular to the bottom panel;
a cover panel mounted to the enclosure body, the cover panel substantially parallel to the bottom panel; and
a positioning element mounted between the cover panel and the power supply unit, the positioning element comprising a plate body, a first positioning portion extending from the plate body, and a second positioning portion extending from the plate body, the power supply unit sandwiched between the bottom panel and the plate body, the first positioning portion contacting the power supply unit for preventing the power supply unit from moving along a second direction substantially parallel to the bottom panel, the second positioning portion contacting the power supply unit for preventing the power supply unit from moving along a third direction that is substantially parallel to the bottom panel and substantially perpendicular to the second direction;
wherein an airflow opening is defined in the rear panel corresponding to the power supply unit; the rear panel comprises a plurality of protrusions adjacent to the airflow opening, and a plurality of positioning holes is defined in the power supply unit corresponding to the protrusions.

10. The power supply assembly of claim 9, wherein the plate body comprises a larger portion and a narrower portion extending from the larger portion; the first positioning portion extends from the larger portion, and the second positioning portion extends from the narrower portion.

11. The power supply assembly of claim 10, wherein the enclosure body comprise a drive bracket, the plate body placed between the rear panel and the drive bracket.

12. The power supply assembly of claim 11, wherein a first mounting opening is defined in the rear panel, and the plate body comprises a first supporting portion corresponding to the first mounting opening.

13. The power supply assembly of claim 12, wherein the first supporting portion is L-shaped.

14. The power supply assembly of claim 12, wherein a second mounting opening is defined in the drive bracket, and the plate body comprises a second supporting portion corresponding to the second mounting opening.

15. The power supply assembly of claim 9, wherein the positioning element further comprises an elastic tab extending from the plate body, the elastic tab abutting elastically the cover panel.

16. The power supply assembly of claim 9, wherein the power supply unit defines a front surface and a first side surface substantially perpendicular to the front surface, the first positioning portion contacting the first side surface, and the second positioning portion contacting the front surface.

17. The power supply assembly of claim 9, wherein the rear panel comprises a first resisting plate and a second resisting plate extending from opposite sides of the airflow opening.

18. A power supply assembly, comprising:
an enclosure body comprising a bottom panel, a rear panel substantially perpendicular to the bottom panel, and a side panel substantially perpendicular to the bottom panel and the rear panel; an airflow opening defined in the rear panel; the rear panel comprising a first resisting plate and a second resisting plate extending from opposite sides of the airflow opening;
a cover panel mounted to the enclosure body and substantially parallel to the bottom panel;
a power supply unit mounted in the enclosure body, the power supply unit disposed between the bottom panel and the cover panel; the power supply unit is aligned with the airflow opening; the power supply unit is disposed between the first resisting plate and the second resisting plate; and the first resisting plate and the second resisting plate prevent the power supply unit from moving along a first direction substantially parallel to the bottom panel; and
a positioning element mounted between the power supply unit and the cover panel, the positioning element comprising a plate body, a first positioning portion extending from the plate body, and a second positioning portion extending from the plate body; the power supply unit sandwiched between the bottom panel and the plate body; the first positioning portion prevents the power supply unit from moving along the first direction, the second positioning portion prevents the power supply unit from moving along a second direction parallel to the bottom panel and substantially perpendicular to the first direction.

19. The power supply assembly of claim 18, wherein the rear panel comprises a plurality of protrusions adjacent to the airflow opening, and a plurality of positioning holes is defined in the power supply unit corresponding to the protrusions.

* * * * *